(12) United States Patent
Hoffmann et al.

(10) Patent No.: US 11,895,518 B2
(45) Date of Patent: Feb. 6, 2024

(54) DYNAMIC ANALYSIS AND RECONFIGURATION OF CONCURRENT DATA TRANSFER MEANS

(71) Applicant: HDWB, LLC, El Paso, TX (US)

(72) Inventors: Eric William Hoffmann, Saint Francis, WI (US); John Myrl Warren, El Paso, TX (US)

(73) Assignee: HDWB, LLC, El Paso, TX (US)

( * ) Notice: Subject to any disclaimer, the term of this patent is extended or adjusted under 35 U.S.C. 154(b) by 0 days.

(21) Appl. No.: 18/105,894

(22) Filed: Feb. 6, 2023

(65) Prior Publication Data
US 2023/0189029 A1    Jun. 15, 2023

Related U.S. Application Data

(63) Continuation-in-part of application No. 17/037,084, filed on Sep. 29, 2020, now Pat. No. 11,575,463, which is a continuation-in-part of application No. 16/386,882, filed on Apr. 17, 2019, now Pat. No. 10,791,437.

(60) Provisional application No. 62/659,541, filed on Apr. 18, 2018.

(51) Int. Cl.
  *H04W 24/08*   (2009.01)
  *H04B 17/318*   (2015.01)

(52) U.S. Cl.
  CPC .......... *H04W 24/08* (2013.01); *H04B 17/318* (2015.01)

(58) Field of Classification Search
  None
  See application file for complete search history.

(56) References Cited

U.S. PATENT DOCUMENTS

| | | | | |
|---|---|---|---|---|
| 5,212,689 | A * | 5/1993 | Eriksson | H04B 7/061 375/348 |
| 9,154,559 | B1 * | 10/2015 | Bovee | H04L 67/51 |
| 2006/0036764 | A1 * | 2/2006 | Yokota | H04L 67/61 709/240 |
| 2007/0021945 | A1 * | 1/2007 | Riskey | A01K 11/008 702/188 |
| 2016/0142493 | A1 * | 5/2016 | Moriguchi | H04Q 9/00 709/219 |
| 2017/0086054 | A1 * | 3/2017 | Azevedo | H04W 4/70 |
| 2021/0368308 | A1 * | 11/2021 | Katardjiev | H04L 51/226 |

* cited by examiner

*Primary Examiner* — Alpus Hsu
*Assistant Examiner* — Camquyen Thai
(74) *Attorney, Agent, or Firm* — Georgiy L. Khayet

(57) ABSTRACT

Systems and methods for transferring data via a two-way radio transmission are described herein. An example method commences with collecting asset data, determining conditions for transmission of the asset data to a data server, and determining a mode for the transmission of the asset data. The method continues with preprocessing the asset data for the transmission. The preprocessing includes determining that the conditions for transmission of the asset data satisfy predetermined criteria and setting priorities for one or more parts of the asset data. The priorities are set based at least on a type of the data and a location of the data collection device. The method further includes transmitting the asset data to a data server. The asset data is transmitted based on the mode for the transmission and the priorities via at least one of the one or more communication channels.

20 Claims, 11 Drawing Sheets

DYNAMIC ANALYSIS AND RECONFIGURATION OF CONCURRENT DATA TRANSFER MEANS

CROSS-REFERENCE TO RELATED APPLICATIONS

This application is a Continuation-in-part and claims priority of U.S. patent application Ser. No. 17/037,084, filed on Sep. 29, 2020, entitled "DYNAMIC ANALYSIS AND RECONFIGURATION OF CONCURRENT DATA TRANSFER MEANS," which, in turn, is a Continuation-in-part and claims priority of U.S. patent application Ser. No. 16/386,882, filed on Apr. 17, 2019, entitled "DATA TRANSFER UTILIZING TWO-WAY RADIO TRANSMISSION INDEPENDENT OF OR CONCURRENT WITH OTHER DATA TRANSFER MEANS," which claims priority of U.S. Provisional Patent Application No. 62/659,541 filed on Apr. 18, 2018, entitled "METHOD AND SYSTEM FOR THE DATA TRANSFER UTILIZING TWO-WAY RADIO TRANSMISSION INDEPENDENT OF OR CONCURRENT WITH OTHER MEANS OF DATA TRANSFER," which are incorporated herein by reference in their entirety.

TECHNICAL FIELD

The present disclosure relates generally to data processing and more particularly to data transfer utilizing two-way radio transmission.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Existing data communication systems are designed for sending and receiving data at the same time using one communication technique. Conventionally, a cellular device or other high data rate communication device is used to send large quantities of complex data. Traditional cellular data communication systems do not work in areas with limited cellular coverage or where a user does not utilize cellular-based hardware. Systems that use two-way radio communication have limited data transmission throughput and are thus not capable of sending large quantities of complex data.

Even though traditional data communication systems may be capable of using several communication channels (e.g., cellular data communication and WiFi® data communication in cellular devices), the traditional data communication systems typically utilize only one of the communication channels by default and use other communication channels only if the default one is unavailable. The traditional data communication systems do not analyze multiple available communication channels concurrently.

Conventional telemetry systems utilize cellular networks for data transmission. These telemetry systems can be used in vehicles, on personnel, on stationary assets, on mobile assets, and on or within buildings. These systems collect and send data over traditional cellular data communication networks. However, the coverage of cellular networks is limited by the physical infrastructure built by a cellular network carrier, which leaves areas with limited or no cellular coverage. Another limitation of conventional cellular telemetry systems is the adoption of the technology. Industries that utilize other methods of communication for voice transmission, e.g., two-way radio, need additional hardware for cellular data communication.

Other conventional telemetry systems are only capable of collecting data using one method of data communication, such as cellular data communication, two-way radio data communication, or other. Furthermore, existing two-way radio systems are not capable of sending large amounts of complex vehicles, personnel, or asset data.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer-implemented systems and methods for transferring data via a two-way radio transmission. In some example embodiments, a system for transferring data via a two-way radio transmission may include a data collection device and a two-way radio device communicatively coupled to the data collection device. The data collection device may be configured to collect asset data and determine conditions for transmission of the asset data to a data server. The conditions may include a location of the data collection device or signal strengths associated with one or more communication channels. The data collection device may be configured to determine, based on the conditions for transmission, a mode for the transmission of the asset data and preprocess the asset data for the transmission. The preprocessing may include determining that the conditions for transmission of the asset data satisfy predetermined criteria and setting priorities for one or more parts of the asset data based at least on a type of the data and the location of the data collection device. The two-way radio device and the data collection device may be configured to transmit the asset data to a data server. The asset data may be transmitted based on the mode for the transmission and the priorities via at least one of the one or more communication channels.

A method for transferring data via a two-way radio transmission may commence with collecting asset data by a data collection device. The method may continue with determining conditions for transmission of the asset data to a data server. The conditions may include a location of the data collection device or signal strengths associated with one or more communication channels. The method may further include determining a mode for the transmission of the asset data. The mode for the transmission may be determined based on the conditions for transmission. The method may continue with preprocessing, by the data collection device, the asset data for the transmission. The preprocessing may include determining that the conditions for transmission of the asset data satisfy predetermined criteria. The preprocessing may further include setting priorities for one or more parts of the asset data. The priorities may be set based at least on a type of the data and the location of the data collection device. The method may further include transmitting, by one of the data collection device and a two-way radio device communicatively coupled to the data collection device, the asset data to a data server. The asset data may be transmitted based on the mode for the transmission and the priorities via at least one of the one or more communication channels.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings.

DETAILED DESCRIPTION

Figure 1:
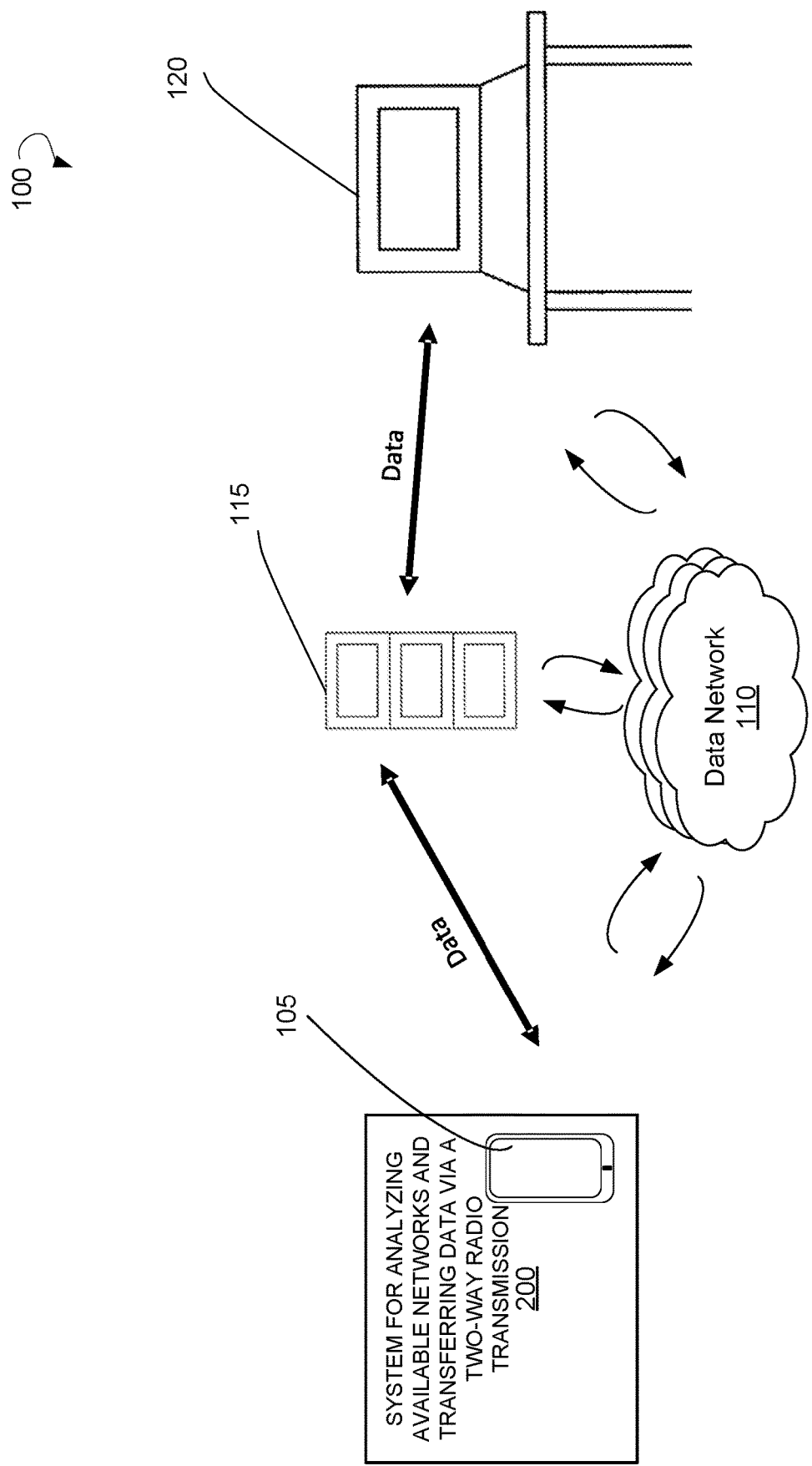
FIG. 1 illustrates an environment within which systems and methods for analyzing available networks and transferring data via a two-way radio transmission can be implemented, in accordance with some embodiments.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The present disclosure provides systems and methods for transferring data via a two-way radio transmission. A system for transferring data via a two-way radio transmission may be configured to collect, store, analyze, and display asset data collected over two-way radio networks either independent of or concurrent with cellular based networks. The system may include a data collection device. The data collection device may be configured to collect asset data and determine conditions for transmission of the asset data to a data server. The conditions may include a location of the data collection device or signal strengths associated with one or more communication channels. The data collection device may be further configured to determine a mode for the transmission of the asset data. The mode for the transmission may be determined based on the conditions for transmission. The data collection device may preprocess the asset data for the transmission. The preprocessing may include determining that the conditions for transmission of the asset data satisfy predetermined criteria and setting priorities for one or more parts of the asset data. The priorities may be set based at least on a type of the data and the location of the data collection device. The system may further include a two-way radio device communicatively coupled to the data collection device. Each of the two-way radio device and the data collection device may transmit the data to a data server based on the mode for the transmission and the priorities. The transmission may be performed via at least one of the one or more communication channels. The communication channel may be a two-way radio communication channel or a cellular communication channel. The collected data can be sent using one or both communication channels.

The systems and methods of the present disclosure can be used to analyze networks to determine an optimal transfer means for transmission of data. The transmission of data can be implemented using a plurality of data transmission protocols and radio bandwidths. In some embodiments, the data transmission can be independent or concurrent with two-way radio transmission. The analysis can be performed to determine availability and fidelity of networks dynamically as the networks increase or decrease in size and based on the changes in quality of transmission overtime. The analysis may include determining available bandwidths between different nodes of a network and predicting changes in the quality of transmission between the nodes. As a result of the analysis, the system may automatically reconfigure the network or notify users of possible issues with connectivity and provide recommendations concerning switching over to different bands or protocols. The system may also provide recommendations on actions to be taken based on what the system learned about interactions of the user with one or more networks.

The system may be used to analyze independent networks, mobile networks, WiFi®, radio network, and determine, based on the analysis, how to utilize available networks for concurrent data transmission. Therefore, the system of the present disclosure can allow analyzing of parameters of different networks to select one or more networks for data transmission and to switch between the networks if parameters of the network do not meet predetermined criteria.

The system of the present disclosure may be used to limit communications based on the analysis of the network. For example, the system may be able to alter the ability to transmit videos over the network. Thus, upon expansion of the edge network, the system may be able to provide real-time data concerning the network capability or automatically adjust the network configuration. The system may automatically add microcell capabilities and Radio Frequency (RF) telemetry in a microcell environment. The system may constantly switch between different frequencies and protocols, for example, from a radio network to a cellular network and then to a mesh network, then to a long-term evolution (LTE) network, and then to a satellite data network. Due to the constant switching between different frequencies and protocols, the communications can crisscross between different frequencies and protocols back and forth.

The two-way radio communication channel expands the range of telemetric data transfer beyond the geographic constraints imposed by traditional cellular networks. For applications and/or locations where two-way radio communication is the primary method for data communication, the system of the present disclosure enables two-way radio devices to accomplish collection and transmission of large amounts of complex data.

The system of the present disclosure allows for the combination of cellular-based and two-way radio-based data transmission into a single system for processing, analyzing, storing, and displaying data. As the system is capable of both two-way radio communication and cellular communication using multiple networks, the system overcomes the geographic constraints of either a two-way radio communication system or a cellular communication system by operating in all areas where there is either cellular or two-way radio coverage or both. Using preprocessing, compressing, and timed transmission of data, the system is capable of using the two-way radio communication channel for transmitting large amounts of complex data via a plurality of networks.

In an example embodiment of the system of the present disclosure, vehicles, personnel, assets, and buildings may be equipped with data transmission devices appropriate for the accessible coverage and data transmission in their functional area. The vehicles, personnel, assets, or buildings present in multiple coverage areas that have varying data transmission capabilities may be equipped with multiple data transmission devices or devices with multi-transmission mode capabilities. Sensor data may be collected for all entities (i.e., the vehicle, personnel, asset, or building) and sent through applicable data transmission channels to the data server. Data collected by two-way radio devices may utilize trunking systems and/or repeaters to transmit the data to a central receiver, where the data may be received and forwarded to the data server. All collected data may be processed and displayed to a user on a web portal.

The system, through the use of preprocessing and timed transmission of data, enables data communication devices to transmit large quantities of complex data over a two-way radio channel either in conjunction with or independent of cellular network channels by constantly switching between various networks based on current parameters of the networks, thus overcoming the geographic constraints of each of the two-way radio channel or cellular network channel to allow telemetry to operate in all areas where there is either cellular or two-way radio coverage or both. The system of the present disclosure may be used in all industries that utilize or can benefit from two-way radio connectivity or multiple modes of data transmission.

Referring now to the drawings, FIG. 1 illustrates an environment 100 within which methods and systems for analyzing available networks and transferring data via a two-way radio transmission can be implemented. The environment 100 may include a data collection and transmission device 105, a data collection, processing, and storage device shown as a data server 115, a user interface portal 120, a system for analyzing available networks and transferring data via a two-way radio transmission also referred to as a system 200, and data networks 110. Though the data collection and transmission device 105 is shown as a single device, in some example embodiments, it may be implemented in form of two devices, namely a data collection device and a two-way radio device communicatively coupled to the data collection device.

The data networks 110 may include a plurality of networks capable of communicating data between devices. Suitable networks may include or interface with any one or more of a cellular data network, a satellite data network, a radio network, a digital RF network, a digital radio network, a Very High Frequency (VHF) network, an Ultra High Frequency (UHF) network, a High Frequency (HF) network, and so forth.

The system 200 may use the data collection and transmission device 105 to send data via one of data communication channels to the data server 115. The data communication channel may be selected from a cellular data communication channel, a two-way radio data communication channel, WiFi®, Bluetooth®, Near Field Communication (NFC), a satellite data communication channel, Ethernet, ZigBee®, Microwave, Infrared, or other forms of wireless RF or wired data transmission. The user interface portal 120 can recall stored data from the data server 115 along with sending data for further processing and storage. The data collection and transmission device 105 can be equipped with electronics for the transmission of data via any single mode or any combination of modes of data transfer, or any combination of cellular, two-way radio, WiFi®, Bluetooth®, NFC, satellite, Ethernet, ZigBee®, Microwave, Infrared, or other forms of wireless RF or wired data transmission.

In an example embodiment, the data collection device and the two-way radio device may be combined into a two-way data transmission radio device capable of digital radio frequency data transmission. The digital data transmission is a two-way half or full duplexed signal between the two-way data transmission radio device and a central base station receiver. The distance over which the signal can travel may be extended using repeaters or radio trunking systems. The base station receiver may act as an intermediate device and may be connected to the Internet and forward data received from the two-way data transmission radio device to a data server. In an example embodiment, the base station receiver may be integrated into the data server. An example base station receiver includes a satellite trunk in a gas field that collects data from two-way radio devices in a gas field, a drone flying over a target and collecting data from the two-way radio devices (e.g., attached to people) in proximity to a target, and so forth.

The data server may process, analyze, and store the collected data. The same data server may be capable of collecting data from cellular transmission devices. The data collected from the two-way data transmission radio device and cellular transmission devices can be recalled by a front-end web application to display the data to a user. In this embodiment, the data may be received by the two-way data transmission radio device via Bluetooth® communication. A secondary device, such as a sensor, with sensory capabilities may collect the data and send the collected data to the two-way data transmission radio device over a Bluetooth® protocol. This information can then be transmitted over a digital radio network. An alternative to Bluetooth® data transfer is a wired serial data transfer. The system of the present disclosure may send data using both handheld and mobile two-way data transmission radio devices. For applications of the system in personnel monitoring, the system may collect and transmit data from the following sensors and inputs: a Global Positioning System (GPS) location, time, speed, direction, orientation, impact detection, impact detection due to gunshot, gunshot detection, biometrics, heartrate, button/switch status, temperature, pressure, light intensity, audio, images, files, magnetic proximity, and so forth. For applications of the system in vehicle or machinery monitoring, the system may collect and transmit data from the following sensors and inputs: a GPS location, time, speed, direction, vehicle speed, a fuel level, a door status, crash detection, driver behavior, gunshot detection, a button/switch status, temperature, pressure, light intensity, audio, a magnetic proximity, Controller Area Network (CAN) data, Local Interconnect Network data, Ethernet data, serial data, engine diagnostic and prognostic data, driver status reports, odometer, a driver user input display status, electronic driver logs, images and files, and so forth. For applications of the system in building monitoring, the system may collect and transmit data from the following sensors and inputs: a GPS location, time, gunshot detection, a button/switch status, temperature, a door open status, a window open status, people counter, pressure, light intensity, audio, images, files, a magnetic proximity, a door barricade status, and so forth.

Figure 2:
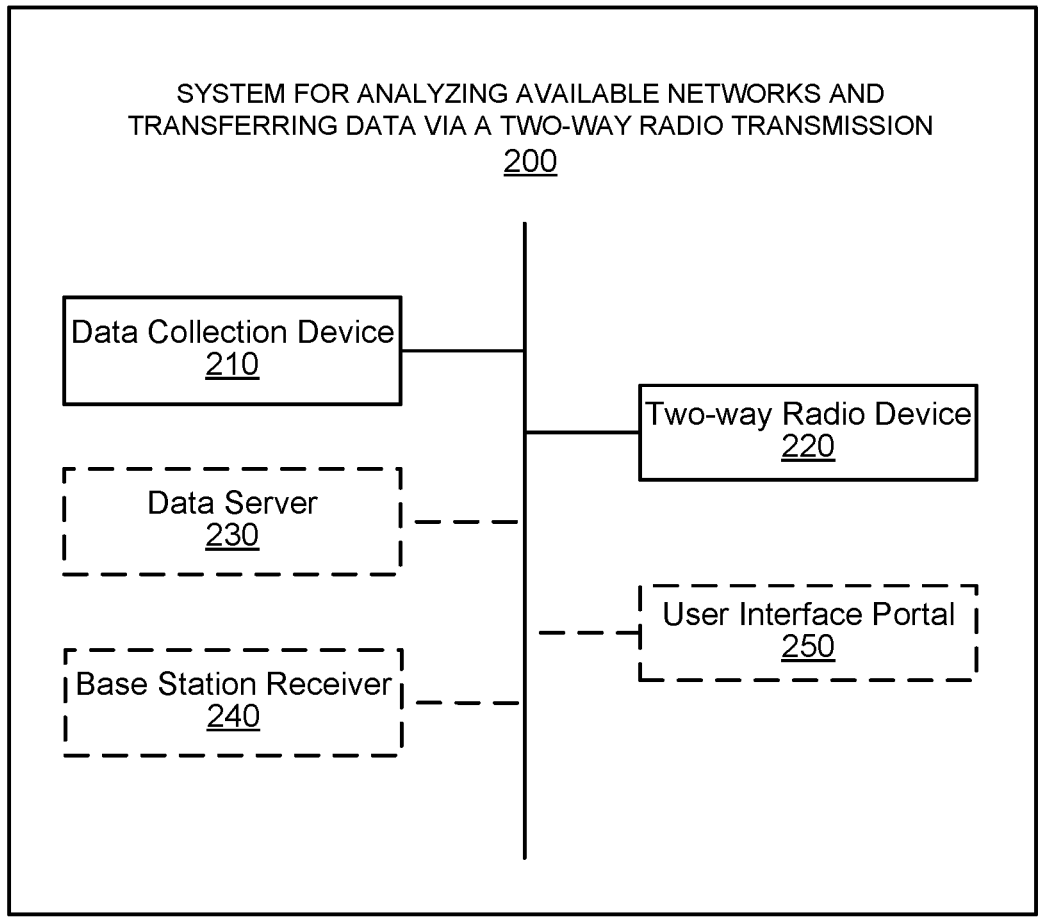
FIG. 2 is a block diagram showing various modules of a system for analyzing available networks and transferring data via a two-way radio transmission, in accordance with certain embodiments.

FIG. 2 is a block diagram showing various modules of a system 200 for analyzing available networks and transferring data via a two-way radio transmission, in accordance with certain embodiments. Specifically, the system 200 may include a data collection device 210, a two-way radio device 220, and optionally a data server 230, a base station receiver 240, and a user interface portal 250 communicatively coupled to the data server 230. In an example embodiment, the two-way radio device 220 and the data collection device 210 may be integrated into a single data collection and transmission device, also referred to herein as a data transmission device. In an example embodiment, the two-way radio device 220 may be integrated into the data collection device 210 or the data collection device 210 may be integrated into the two-way radio device 220. In an example embodiment, the two-way radio device 220 and the data collection device 210 may be resident in the same piece of hardware.

Each of the data collection device 210 and the two-way radio device 220 may include a programmable processor, such as a microcontroller, a central processing unit, and so forth. In example embodiments, each of the data collection device 210 and the two-way radio device 220 may include an application-specific integrated circuit or programmable logic array designed to implement the functions performed by the system 200.

The data collection device 210 may be configured to collect asset data and preprocess the asset data for transmission. The asset data may be associated with at least one of the following: a vehicle, a stationary asset, a mobile asset, a building, personnel, and so forth. In an example embodiment, the asset data may be received from at least one sensor communicatively coupled to the data collection device 210 by at least one of a wired connection or a short-range wireless connection. The at least one sensor may be portable, fixed, integrated into the data collection device 210, or integrated into the two-way radio device 220. The short-range wireless connection may include one or more of the following: WiFi®, Bluetooth®, NFC, ZigBee®, Microwave, Inferred, Radio Frequency Identification, and so forth. The wired connection may include one of the following: a Universal Serial Bus (USB) connection, a serial connection, an Ethernet connection, and so forth.

The at least one sensor may provide one or more of the following parameters: a GPS location, a time, a speed, a direction, an orientation, an impact detection, an impact detection due to a gunshot, a gunshot detection, a biometric data, a radiological snapshot, a heartrate, a button status, a switch status, a temperature, a pressure, a light intensity, an audio, an image, a file, a magnetic proximity, a radiological parameter, a door status, a window status, a people counter, a door barricade status, a fuel level, a crash detection, a driver behavior, a CAN data parameter, a Local Interconnect Network data parameter, an Ethernet data parameter, a serial data parameter, an engine diagnostic and prognostic data parameter, a driver status report, an odometer reading, a driver user input display status, an electronic driver log, and so forth.

The data collection device 210 may be further configured to dynamically analyze networks available for transmission of the asset data. The analysis may include determining the availability and fidelity of the networks dynamically as the networks increase or decrease in size. In an example embodiment, the analysis may include predicting availability and fidelity of the networks dynamically based on changes in the quality of transmission of data over the networks over time. In a further example embodiment, the analysis may include determining available bandwidths between different nodes of one of the networks and predicting changes in the quality of transmission between the nodes.

The data collection device 210 may be further configured to automatically change the configuration of at least one of the networks. In some example embodiments, the data collection device 210 may automatically add microcell capabilities and radio frequency telemetry in a microcell environment associated with one or more of the networks.

Additionally, the data collection device 210 may be configured to notify a user of possible issues with the connectivity associated with the at least one of the networks and provide a recommendation on switching over to a different network. In a further example embodiment, the data collection device 210 may be configured to analyze interactions of a user with one or more of the networks. Based on the interactions, the data collection device 210 may provide a recommendation on switching between the networks. Based on the analysis of networks, the data collection device 210 may determine utilization of the networks for optimal data transmission over one or more of the networks concurrently.

The data collection device 210 may be further configured to determine a mode for the transmission of the asset data. The mode for the transmission may be determined based on the analysis of the networks. The mode for the transmission may be further determined based on one or more of the following: a data channel bandwidth, a feedback from the data server, historical data, data sensitivity, a scrambling requirement, a data prioritization requirement, data classification, a metric, signal strength, and the like. The mode for the transmission may include sending the data via a two-way radio communication channel, sending the data via a cellular communication channel, sending the data via a satellite communication channel, constantly switching between frequencies and protocols associated with the networks, and sending the data via any combination of the communication channels.

The two-way radio device 220 may be communicatively coupled to the data collection device 210. The two-way radio device 220 and the data collection device 210 may be configured to transmit the asset data to a data server based on the determined mode for the transmission. Specifically, the two-way radio device 220 and the data collection device 210 may be remotely programmable to operate in a plurality of communication channels and transmit the asset data via a plurality of intermediate devices. In view of this, the asset data may be transmitted via at least one communication channel and using at least one intermediate device. The intermediate device may be one of a repeater and a radio trunking system. The intermediate device may be part of one or more of the following networks: a cellular data network, a satellite data network, a radio network, a digital RF network, a digital radio network, a VHF network, and a UHF network. The two-way radio device 220 and the data collection device 210 may be further configured to constantly switch between frequencies and protocols associated with the networks.

In an example embodiment, the asset data may be transferred to the data server 230 via the base station receiver 240. The base station receiver 240 may include one of the following: a drone, a vehicle, a stationary computer, a portable computer, and so forth. The at least one communication channel may include one or more of the following: a two-way radio communication channel (via a two-way radio protocol), a cellular communication channel, and a satellite communication channel. The mode for the transmission may alternate seamlessly between a two-way radio network and a cellular data network, using any of a digital RF network, a digital radio network, a VHF network, and an UHF network. In other words, the transmission of the asset data via the two-way radio protocol may be seamlessly changed to the transmission of the asset data via the cellular communication channel and/or the satellite communication channel, and vice versa using one of the networks selected based on the analysis of the networks.

The pre-processing of the asset data may include analyzing the asset data by the data collection device 210. The results of the analysis may also be transmitted in a form of analytics data to the data server 230. Therefore, the data transmitted via the two-way radio communication channel (over the radio narrow band) may include analytics data in addition to the collected data. This is in contrast to conventional radio communication systems in which only text messaging is performed over the radio narrow band when the two-way radio communication device is located in an area with limited radio network coverage.

The user interface portal 250 may be communicatively coupled to the data server 230. The user interface portal 250 may be configured to provide a user with an access to the asset data stored on the data server 230 for rendering and visualization on a user device.

In an example embodiment, the system 200 may include both hardware and software systems. A digital mobile two-way radio device may function as the data transmission device. The digital mobile two-way radio device may be capable of digital data transmission from remote locations to central sites with Internet access. Sensor data may be collected by the digital mobile two-way radio device for wireless transmission. A data server may be used for the processing, analysis, and storage of the data. A handheld or personal computer may be used for recalling the stored information for visualization. The digital mobile two-way radio device may send the collected data to a central site. A processor of the central site may receive the data and then send the data to the data server. A processor of the data server may receive the data from the central site, and store, post process, analyze, and deliver data to a user interface portal.

In another example embodiment, the system 200 may include the following components: a two-way radio device, a base station receiver, and a receiver computer having a programming processor. The optional components may include sensors, servers, server software, a user interface portal, two-way radio networks, cellular networks, handheld or personal computers, persons, buildings, vehicles, assets, and so forth. To enhance the system 200, the system 200 may include a device capable of communicating data using multiple data communication channels (for example, two-way radio and cellular data channels) for data transmission. Furthermore, the remote reprogramming and/or configuration of the data transmission device or its connected intermediate devices or vehicles may be provided by the system 200. The system 200 may also allow for the remote control of the data transmission device and its connected intermediate devices or vehicles.

Intermediate data transfers between the main components of the system 200 may be used. Analog two-way radio networks may be utilized for data transfer. Multiple sensor inputs can be used in the system 200 for data collection.

In an example embodiment, the system 200 may include a two-way radio device and a data collection device. The two-way radio device may be in communication with the data collection device via a connecting interface, such as Bluetooth®, a USB connection, a serial connection, an Ethernet connection, and so forth. The two-way radio device may primarily function as a wireless radio frequency transmitter and may also perform secondary data transmission between the two-way radio device and the data collection device. The data collection device may include a phone, a smartphone, a vehicle black box, a base station, and so forth.

Therefore, in one example embodiment, the system 200 may have two separate devices: a two-way radio device, e.g., a Bluetooth® capable radio device, and a data collection device, e.g., a standard smartphone. In another example embodiment, the system 200 may have one data transmission device capable of both data collection and radio transmission.

In an example embodiment, the data collection device 210 and the two-way radio device 220 may not need to be manually paired by a user. Instead, the data collection device 210 and the two-way radio device 220 may recognize each other automatically, connect via one or more data transfer protocols (e.g., NFC, Bluetooth®, WiFi®, WiFi® Direct, and so forth), and communicate data between each other in a passive nature, without receiving a direct command form the user. Furthermore, the data collection device 210 may connect automatically to sensors, for example, with radio-frequency identification (RFID). The sensors may be installed on objects in proximity to or at a distance from the data collection device 210 and may communicate the collected data to the data collection device 210, e.g., via RFID, NFC, Bluetooth®, and so forth.

Figure 3:
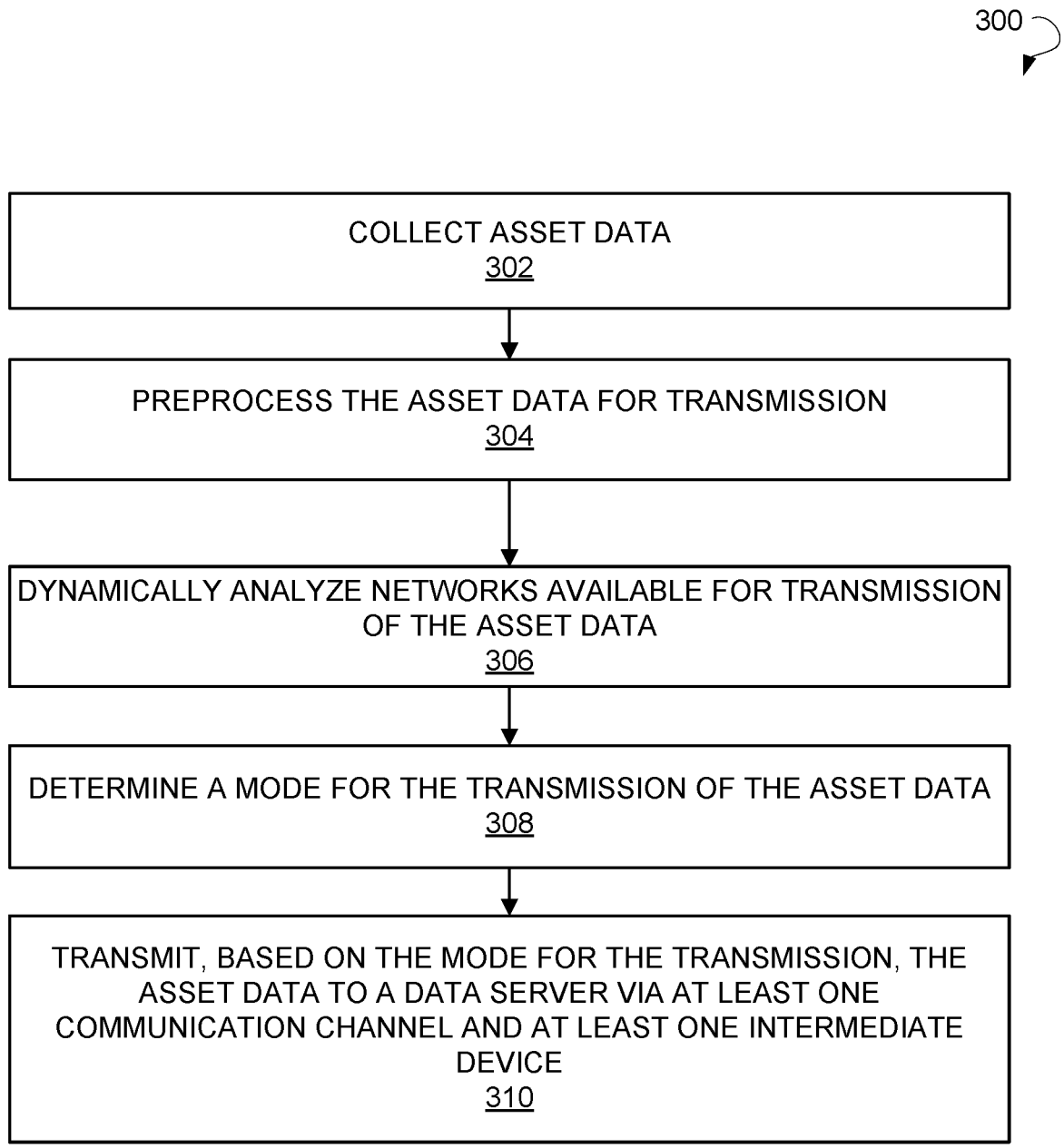
FIG. 3 is a flow chart illustrating a method for analyzing available networks and transferring data via a two-way radio transmission, in accordance with an example embodiment.

FIG. 3 is a process flow diagram showing a method 300 for analyzing available networks and transferring data via a two-way radio transmission, according to an example embodiment. In some embodiments, the operations may be combined, performed in parallel, or performed in a different order. The method 300 may also include additional or fewer operations than those illustrated. The method 300 may be performed by processing logic that may include hardware (e.g., decision making logic, dedicated logic, programmable logic, and microcode), software (such as software run on a general-purpose computer system or a dedicated machine), or a combination of both.

The method 300 may commence with collecting, by a data collection device, asset data at operation 302. The method 300 may continue with preprocessing, by the data collection device, the asset data for transmission at operation 304. In an example embodiment, the preprocessing may include one or more of the following: compressing, packaging, timing, rearranging, classifying, prioritizing, and encrypting. The encrypting may include a burst radio communication, a radio assignment of intermediate devices for transmission, a combination of communication channels, frequencies, bands, VHF, and UHF, and the like.

The burst radio communication may include transferring small (e.g., lasting for milliseconds) bursts of data. Furthermore, bursts of data may be performed by different data transmission devices at different locations. As these bursts of data are short in time and originate from multiple random data transmission devices at multiple locations, the bursts of data may be untraceable for an intruder. Furthermore, different data transmission devices may choose different frequencies for sending portions of data. Therefore, the data transmission devices may change frequencies, bands, and communication channels between the data transmission devices and may transfer the data to random data transmission devices and at random time intervals. Thus, the location of the data transmission devices and metrics of the data transfer networks may be untraceable for the intruder because the data transmission devices may perform bursts of data randomly from multiple locations and using different frequencies and different communication channels.

The method 300 may further include dynamically analyzing, by the data collection device, networks available for transmission of the asset data at operation 306. The analysis may include determining availability and fidelity of the networks dynamically as the networks increase or decrease in size. In an example embodiment, the analysis may include predicting availability and fidelity of the networks dynamically based on changes in quality of transmission of data over the networks over time. In a further example embodiment, the analysis may include determining available bandwidths between different nodes of one of the networks and predicting changes in a quality of transmission between the nodes.

The data collection device may be further configured to automatically change the configuration of at least one of the networks. In some example embodiments, the data collection device may automatically add microcell capabilities and radio frequency telemetry in a microcell environment associated with one or more of the networks.

Additionally, the data collection device may notify a user of possible issues with the connectivity associated with the at least one of the networks and provide a recommendation on switching over to a different network. In a further example embodiment, the data collection device may be configured to analyze interactions of a user with one or more of the networks. Based on the interactions, the data collection device 210 may provide a recommendation on switching between the networks. Based on the analysis of networks, the data collection device may determine utilization of the networks for optimal data transmission over one or more of the networks concurrently.

The method 300 may further include determining, by the data collection device, based on the analysis, a mode for the transmission of the asset data at operation 308. The method 300 may continue with transmitting the asset data to a data server at operation 310. The data asset may be transmitted by at least one of the data collection device and the two-way radio device communicatively coupled to the data collection device. The transmission may be performed based on the mode for the transmission and via at least one communication channel and at least one intermediate device. The mode for the transmission may alternate seamlessly between a two-way radio network and a cellular data network.

Figure 4:
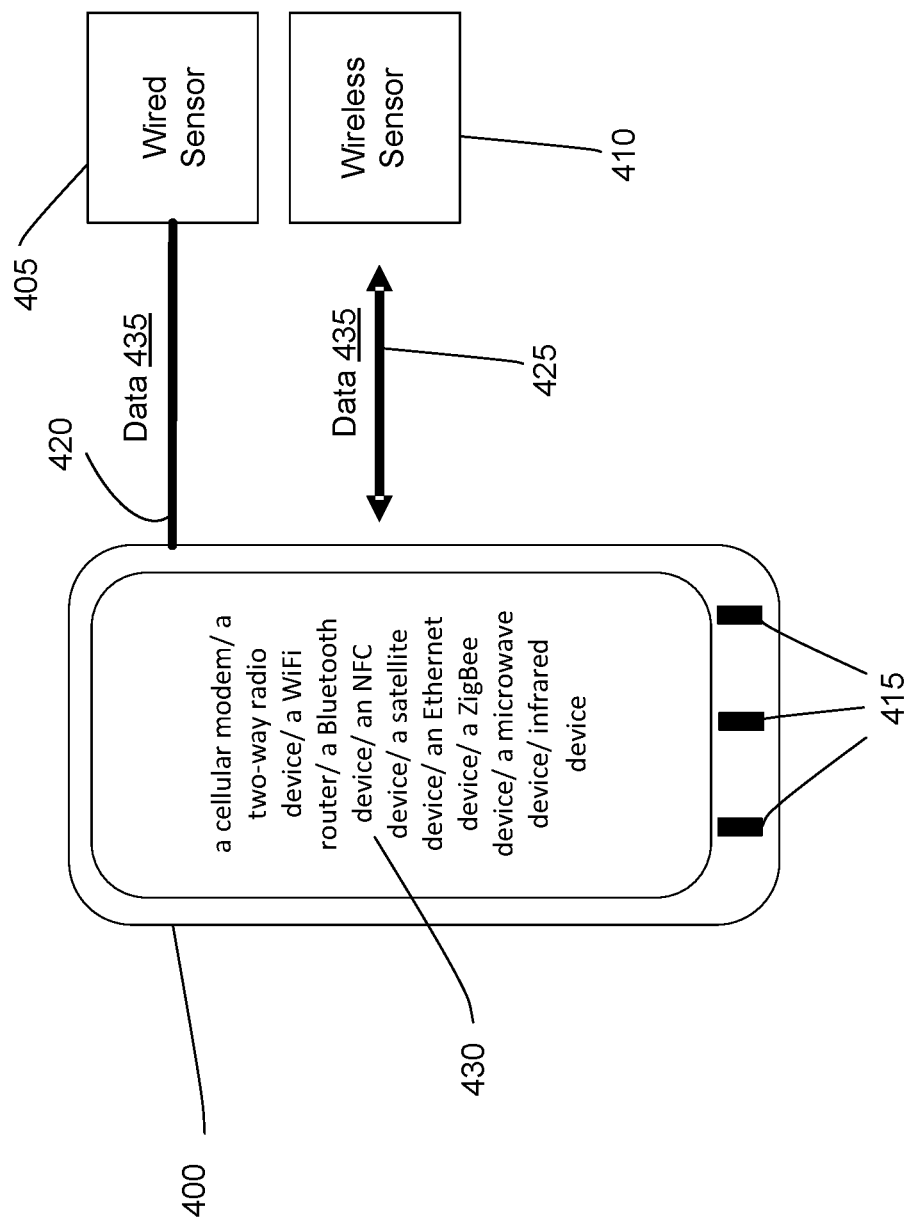
FIG. 4 is a schematic diagram showing a data transmission device, according to an example embodiment.

FIG. 4 is a schematic diagram showing a data transmission device 400, according to an example embodiment. The data transmission device 400 may act as or may have one or more of the following functionalities 430: a cellular modem, a two-way radio device, a WiFi® router, a Bluetooth® device, an NFC device, a satellite device, an Ethernet device, a ZigBee® device, a microwave device, and infrared device, and the like. The data transmission device 400 may be a combination of a data collection device 210 and a two-way radio device 220 shown on FIG. 2.

The data transmission device 400 may have sensors, such as a wired sensor 405 and a wireless sensor 410. Furthermore, sensors 415 may be fixed on the data transmission device 400. The wired sensor 405 may be remotely connected to the data transmission device 400 via a wired connection 420. The wireless sensor 410 may be wirelessly connected via a wireless connection 425, such as cellular, two-way radio, WiFi®, Bluetooth®, NFC, Satellite, ZigBee®, Microwave, Infrared, or other forms of wireless RF connection. The sensors may provide data assets shown as data 435 to the data transmission device 400 using the wired connection 420 or the wireless connection 425.

In an example embodiment, the data transmission device 400 may be associated with a user. For example, the user may use the data transmission device 400 as a personal mobile device connected to both a two-way radio communication channel and cellular communication channel. The data transmission device 400 may be configured to analyze current conditions associated with each of the two-way radio communication channel and the cellular communication channel (such as network coverage, bandwidth), current location of the data transmission device 400, predetermined conditions set by the user, service plans of the user associated with the cellular network operator and a radio communication network, and so forth.

The data transmission device 400 may analyze current conditions associated with each of the two-way radio communication channel and the cellular communication channel by sending requests to a data server and, upon receiving responses from the data server, determining the current status of the each of the two-way radio communication channel and cellular communication channel (such as response time, bandwidth, service availability, and so forth). In case of failure of one of the communication channels (e.g., unavailability), the system 200 uses another communication channel for the data transmission. Therefore, the data transmission device 400 may determine analytically which communication channel is optimal (i.e., satisfies predetermined criteria) for the data transmission at a current moment of time.

In addition, when using the cellular communication channel, the data transmission device 400 may collect metrics from a cellular service provider and from the data transmission device 400 itself. The metrics may include network coverage, signal strength, service availability, and so forth. If the data transmission device 400 determines, based on the metrics, that the quality of service provided through the cellular communication channel is below a predetermined threshold, the data transmission device 400 may select the two-way communication channel for data transmission.

The data transmission device 400 may further analyze the signal to determine the coverage, signal strength, service availability, and so forth. In this case, the data transmission device 400 may be configured to measure metrics related to the cellular transmission channel and/or radio transmission channel.

The analysis may further include analyzing the location of the data transmission device 400. The current location of the data transmission device 400 may be matched to a map of signal strength. The map of signal strength may be received from a database or generated based on historical data related to the signal strength at different locations.

The data transmission device 400 may further analyze the frequency of each of communication channels. The data transmission device 400 may have a list of frequencies that work better at a current location or in a current environment.

Based on the analysis, the data transmission device 400 may alternate seamlessly between data communication channels. The user may set one of the communication channels as a primary communication channel for data transmission. In this case, the data transmission device 400 may send the data over the primary communication channel and, if the primary communication channel is unavailable or the quality of service of the primary communication channel is below a predetermined threshold, the data transmission device 400 may change the mode of data transmission by switching to a secondary communication channel for data transmission.

Furthermore, the user may set a schedule for using each of the data communication channels. For example, the user selects hours for using the cellular communication channel for the data transmission, while the data may be transmitted via the two-way radio communication channel during the rest of time.

The data transmission device 400 may perform compression and pre-analysis of the collected data before sending. By decreasing the amount of the transferred data using the compression and pre-processing of data, the costs of the user for communicating the data over the cellular network and/or the radio communication network may be saved.

In a further example embodiment, the preprocessing may include deriving a portion of data from the collected data. In this case, only the derived portion of data may be transmitted instead of transmitting the whole amount of the collected data. The deriving may be performed based on predetermined criteria. For example, a data collection device installed at an industrial object may need to communicate a condition of a piece of equipment to a central processing unit. Therefore, though the data collection device may collect a plurality of data related to the piece of equipment, the data collection device may transfer only the condition of the piece of equipment.

In a further example embodiment, the preprocessing may include rearranging of data. The rearranging may include removing irrelevant portions of data, removing duplicate data, sorting data, and so forth. The rearranging of data may decrease the amount of data to transfer.

In an example embodiment, the pre-processing of data may include prioritization of the data. The data may be prioritized by the data transmission device 400 based on predetermined criteria. The predetermined criteria may include a data type, frequency, location, environmental conditions, time-stamping, cellular metadata (metrics), WiFi® parameters, Bluetooth® connectivity, two-way radio connectivity, historical data related to network connectivity and/or availability, and the like.

For example, the data may be analyzed to classify the data by determining the type of data, the size, the source, the intended destination, and the like. The data transmission device 400 may set the priority to the data based on the determined type of the data. Data having higher priority may be sent first. In some embodiments, the data transmission device 400 may prioritize data only if a predetermined condition is met (for example, in case of a limited bandwidth, low signal level, low battery level of the data transmission device 400, and the like). For example, the collected data to be transferred may include an emergency notification (e.g., a gunshot detection) and a radiological snapshot. The data transmission device 400 may determine that the size of the radiological snapshot is higher than a predetermined threshold. Furthermore, the data transmission device 400 may follow a predetermined rule according to which emergency notifications are to be assigned the highest priority. In this embodiment, the data transmission device 400 may assign the higher priority to the emergency notification and transfer the emergency notification first.

In another example embodiment, the collected data to be transferred may include a text message and a radiological snapshot. In this embodiment, the data transmission device 400 assigns the higher priority to the radiological snapshot because a user may want to know first whether the user has a dangerous radiological signature.

The predetermined criteria for prioritizing data may be set based on the location of the data transmission device 400, the activity/industry in which the data transmission device 400 is involved (e.g., oil and gas industry, military, vehicle diagnostics), activity performed by the user, and so forth.

The data transmission device 400 may constantly analyze the conditions related to network connectivity of all communication channels and may be able to select, based on the analysis, the communication channel that provides better service in a current environment and under current conditions than that provided by another communication channel/channels.

In some example embodiments, the data transmission device 400 may transmit the data using both a two-way radio network and a cellular data network simultaneously. In particular, the data transmission device 400 may split the data and transfer a first portion of data via a two-way radio data communication channel and simultaneously transfer a second portion of the data via a cellular data communication channel.

In another example embodiment, the data transmission device 400 may determine that there is currently no connectivity over the cellular data communication channel or the satellite data communication channel. The data transmission device 400 may communicate with one or more other data transmission devices in radio-range proximity to data transmission device 400 and transmit the data to one or more other data transmission devices. The other data transmission devices, in turn, may transfer data to further data transmission devices until finding a data transmission device that has a connectivity over the cellular data communication channel or the satellite data communication channel and can transfer data to a central data server over the cellular data communication channel or the satellite data communication channel. Therefore, each of the data transmission devices may act as a repeater and may transfer the data to further data transmission devices. Therefore, the data transmission devices acting as repeaters of each other may create a two-way radio mesh network.

For example, a data transmission device installed in a military vehicle in the desert may have the two-way radio connectivity with data transmission devices installed in other military vehicles spread in the desert but may have no cellular connectivity or satellite connectivity. The data transmission device may communicate to other data transmission devices until the data are received by a data transmission device that has the cellular connectivity or satellite connectivity is found. This data transmission device may transfer the data to the intended endpoint via the cellular communication channel or the satellite communication channel. In some embodiments, in a group of data transmission devices, e.g., a military group, only one data transmission device may need to have both two-way radio connectivity and satellite connectivity, while the rest of the data transmission devices may have only the two-way radio connectivity.

Figure 5:
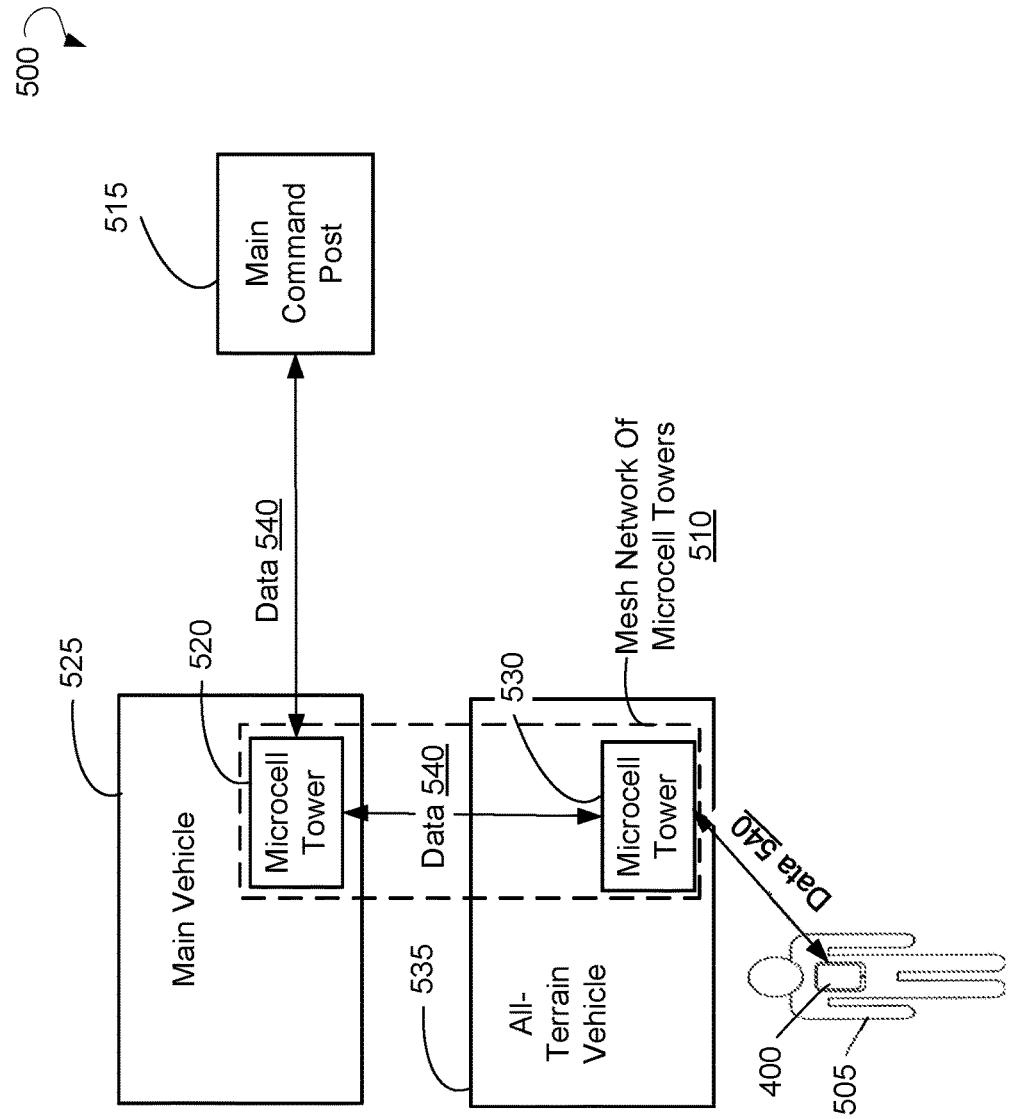
FIG. 5 is a schematic diagram showing associating with and/or placing a data transmission device on various objects, according to an example embodiment.

FIG. 5 is a schematic diagram 500 showing associating with and/or placing a data transmission device 400 on various objects, according to an example embodiment. A border patrol officer 505 may be associated with the data transmission device 400 and utilize a mesh network 510 of microcell towers backhauling to the main command post 515. One microcell tower 520 can be located on a main vehicle 525 while another microcell tower 530 can be located on an all-terrain vehicle (ATV) 535. When the main vehicle 525 cannot be driven any further, the border patrol officer 505 can leave the main vehicle 525 and drive the ATV 535. The microcell tower 530 on the ATV 535 can communicate data 540 to and from the data transmission device 400 of the border patrol officer 505. As the microcell towers 520 and 530 make the mesh network 510 that is backhauling to the main command post 515, the microcell tower 530 on the ATV 535 can communicate data 540 to and from the microcell tower 520 on the main vehicle 525, while the microcell tower 520 on the main vehicle 525 communicates data 540 to and from the main command post 515. The data transmission device 400 can monitor the network and alert the border patrol officer 505, for example, by issuing a warning "Hey, you're getting close to the edge of the fade margin" when the border patrol officer 505 is getting too far from the ATV 535 or when the ATV 535 is getting too far from the main vehicle 525. When there are too many border patrol officers in the field, the data transmission device 400 may issue, for example, a warning "You've got too many nodes out into the field" because of possible limitations to the bandwidth.

Figure 6:
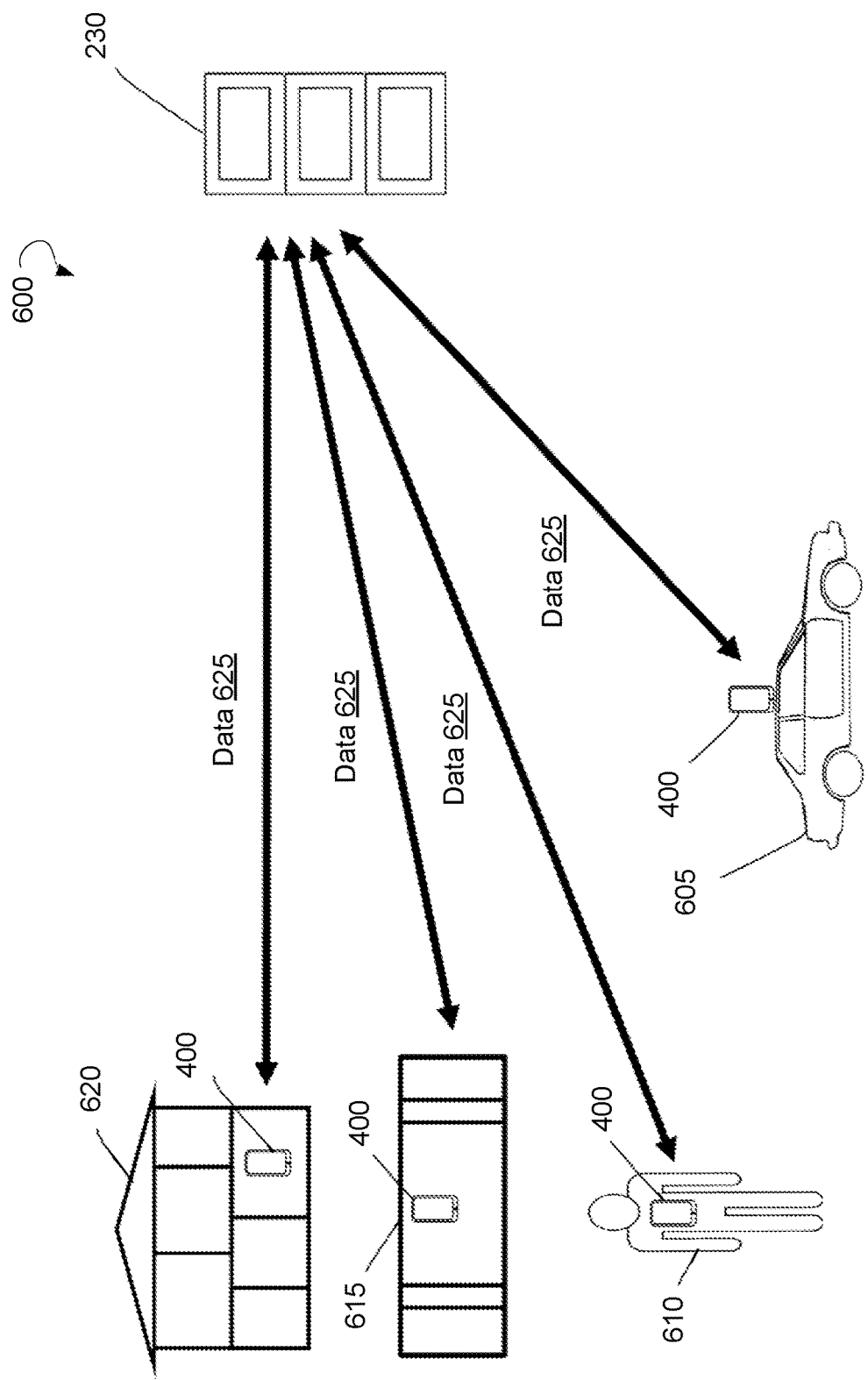
FIG. 6 is a schematic diagram showing associating with and/or placing a data transmission device on various objects, according to an example embodiment.

FIG. 6 is a schematic diagram 600 showing associating with and/or placing a data transmission device 400 on various objects, according to an example embodiment. The data transmission device 400 can be placed on vehicles 605, personnel 610, assets 615 (e.g., a garage), and in a building (e.g., in a building 620) to collect asset data shown as data 625 and transmit the data 625 via wireless or wired data transfer to the data server 230 acting as a data collection, processing, and storage device.

The data transmission device 400 may be placed on personnel 610 to perform personnel monitoring of a health condition of the persons and send, upon detection of a health issue, a notification to a data center and/or an appropriate third party (e.g., a health care provider) over the two-way data communication channel and/or the cellular communication channel. The health issue may be detected by sensing biometric data of the person and determining, based on the biometric data, that the biometric data relates to a health condition. The biometric data of the person may be sensed by sensors attached to the person or located in proximity to the person, such as a heart monitor, a fitness tracker, a mobile device, a temperature sensor, a radiological sensor, and so forth. The data transmission device 400 may collect the data detected by the sensors and send the data to the data server and/or the appropriate third party.

The data transmission device 400 may be placed on vehicles 605, personnel 610, assets 615, and buildings 620 to detect gunshots, take radiological snapshots associated with an area or an object, detect a predetermined condition (e.g., a street fight, property damage), and so forth. The detected data may be optionally pre-processed and sent to a data server or to an appropriate third party (police, first responders, etc.) via one or more of the two-way data communication channel and/or the cellular communication channel.

Figure 7:
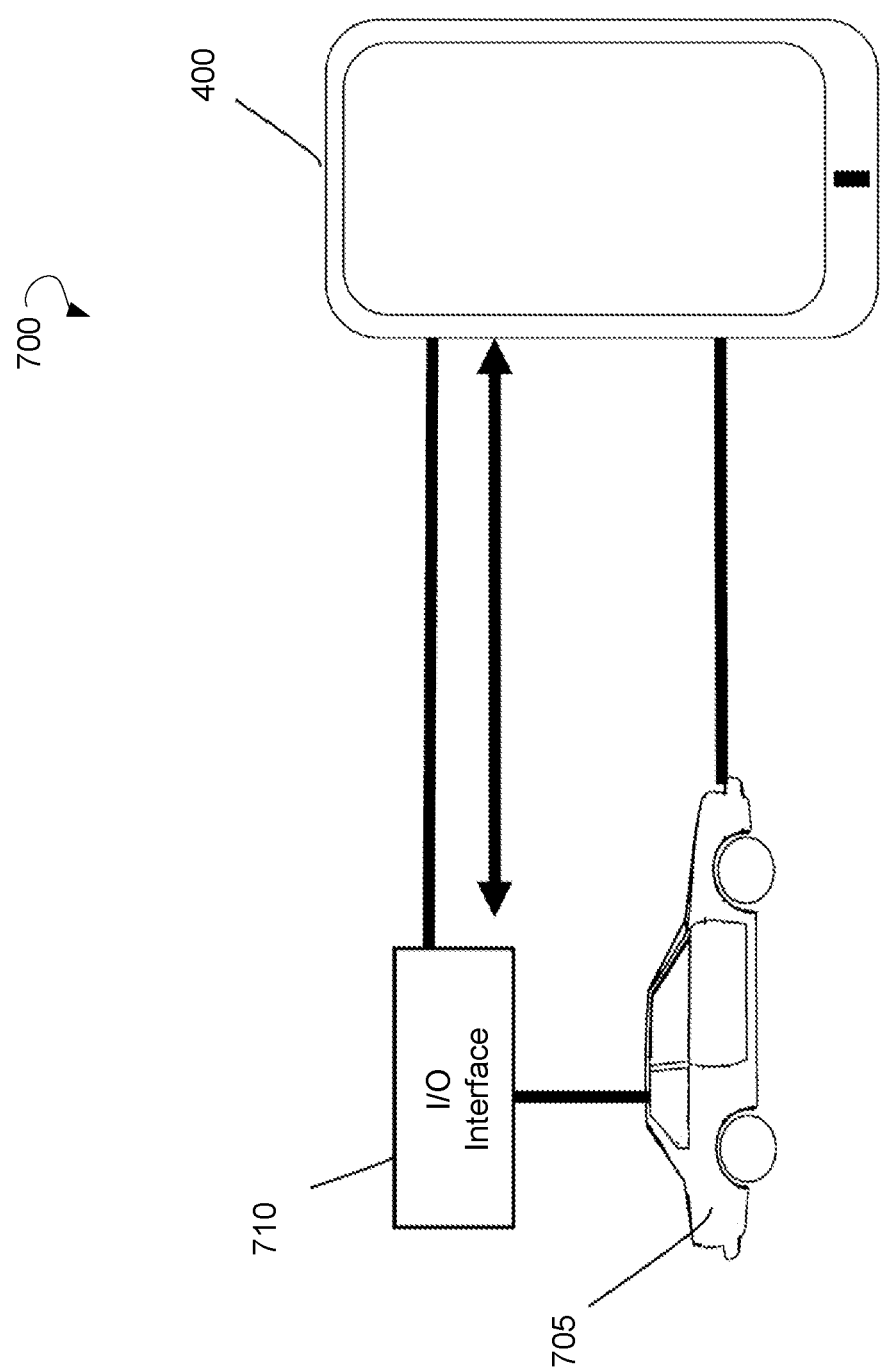
FIG. 7 is a schematic diagram showing a data transmission device placed on a vehicle, according to an example embodiment.

FIG. 7 is a schematic diagram 700 showing a data transmission device 400 placed on a vehicle, according to an example embodiment. The data transmission device 400 may connect directly to the vehicle 705 for data collection. Alternatively, the data transmission device 400 may connect to the vehicle 705 via an intermediate device 710, such as in input/output (I/O) interface. The connection to the intermediate interface device 710 may be either wired or wireless. The data transmission device 400 may be configured to perform wired input data collection and output control to the intermediate interface 710 on the vehicle 705.

Figure 8:
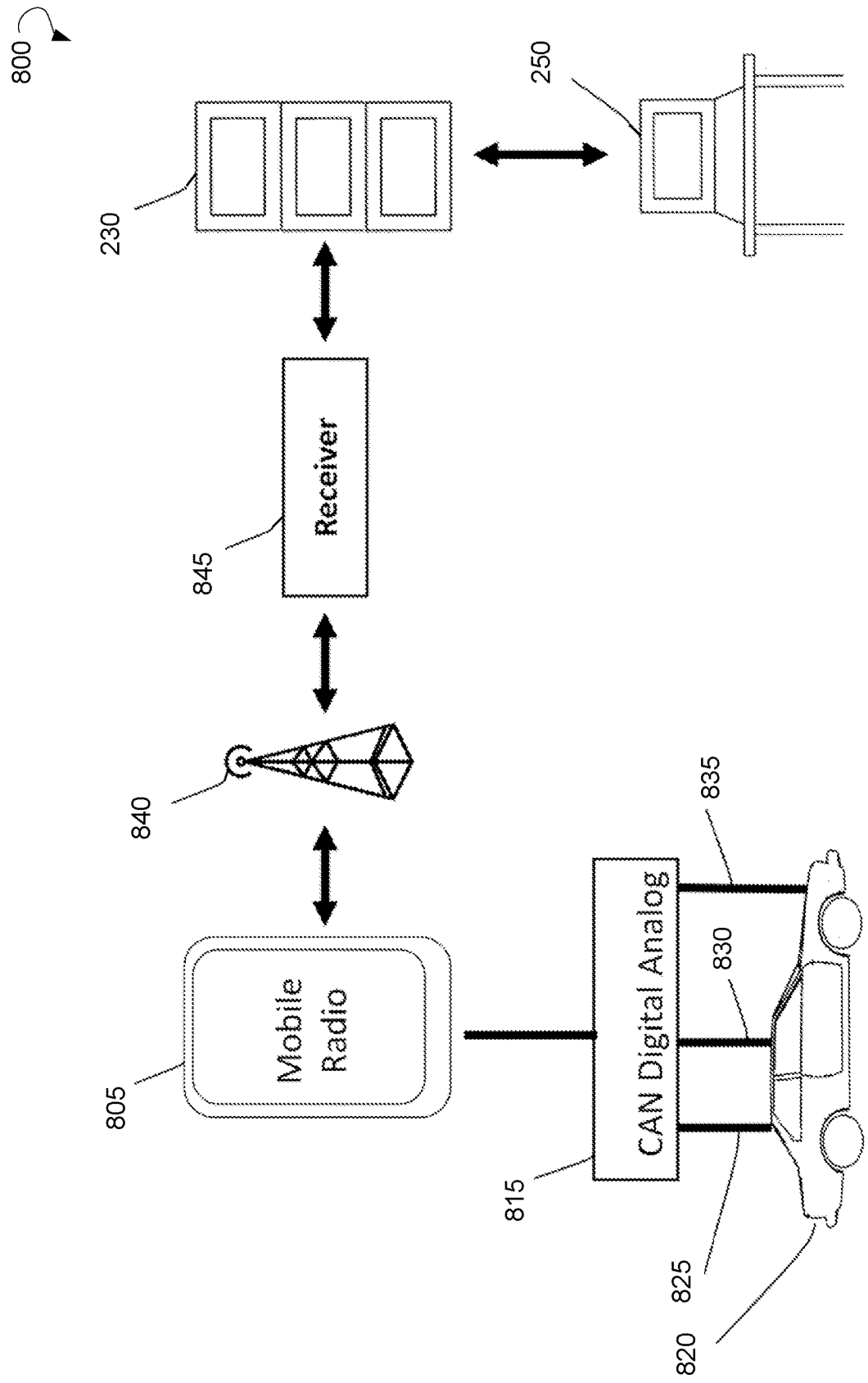
FIG. 8 is a schematic diagram showing a data transmission device represented by a mobile two-way digital radio device, according to an example embodiment.

FIG. 8 is a schematic diagram 800 showing a data transmission device represented by a mobile two-way digital radio device 805, according to an example embodiment. The mobile two-way digital radio device 805 interfaces with an intermediate device 815 via serial data connection. The intermediate device 815 is installed on a vehicle 820 and collects vehicle information via a CAN connection 825, digital inputs 830, and analog inputs 835. Through the CAN digital analog, engine and vehicle data are interpreted and processed for transfer from the intermediate device 815 to the mobile two-way digital radio device 805. The data are packaged and can be compressed before the data are sent to the mobile two-way digital radio device 805. The data are sent to the mobile two-way digital radio device 805 and rebroadcast over a digital RF network to a receiver 845 of the base station 840. The data are then forwarded to the data server 230 via the Internet. Users can recall the data using the user interface portal 250.

Figure 9:
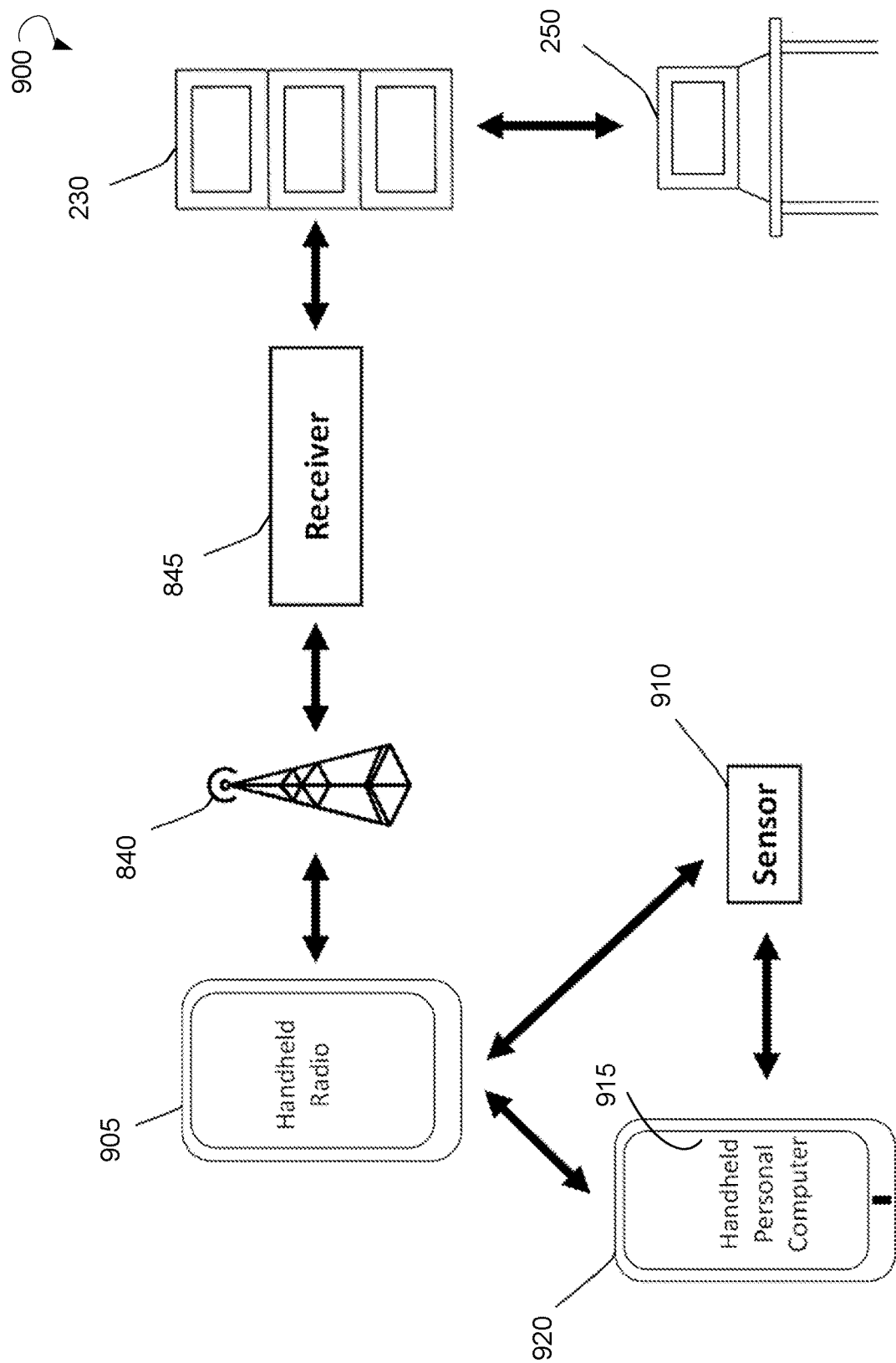
FIG. 9 is a schematic diagram showing a data transmission device represented by a handheld two-way digital radio device, according to an example embodiment.

FIG. 9 is a schematic diagram 900 showing a data transmission device represented by a handheld two-way digital radio device 905, according to an example embodiment. The handheld two-way digital radio device 905 interfaces with a wireless sensor 910 and a handheld personal computer 915 having a mobile operating system 920. The wireless sensor 910 may send data via Bluetooth® directly to the handheld two-way digital radio device 905 or to the handheld personal computer 915. The handheld personal computer 915 may compile wirelessly received sensor data, local device sensor information, user input data, files, images, and audio. The data may be packaged and compressed before the data are sent to the handheld two-way digital radio device 905. The data from the handheld personal computer 915 may be sent over a Bluetooth® connection to the handheld two-way digital radio device 905 and rebroadcast over the digital RF network to a receiver 845 of the base station 840. The data may then be forwarded to the data server 230 via the Internet. Users can recall the data using the user interface portal 250.

Figure 10:
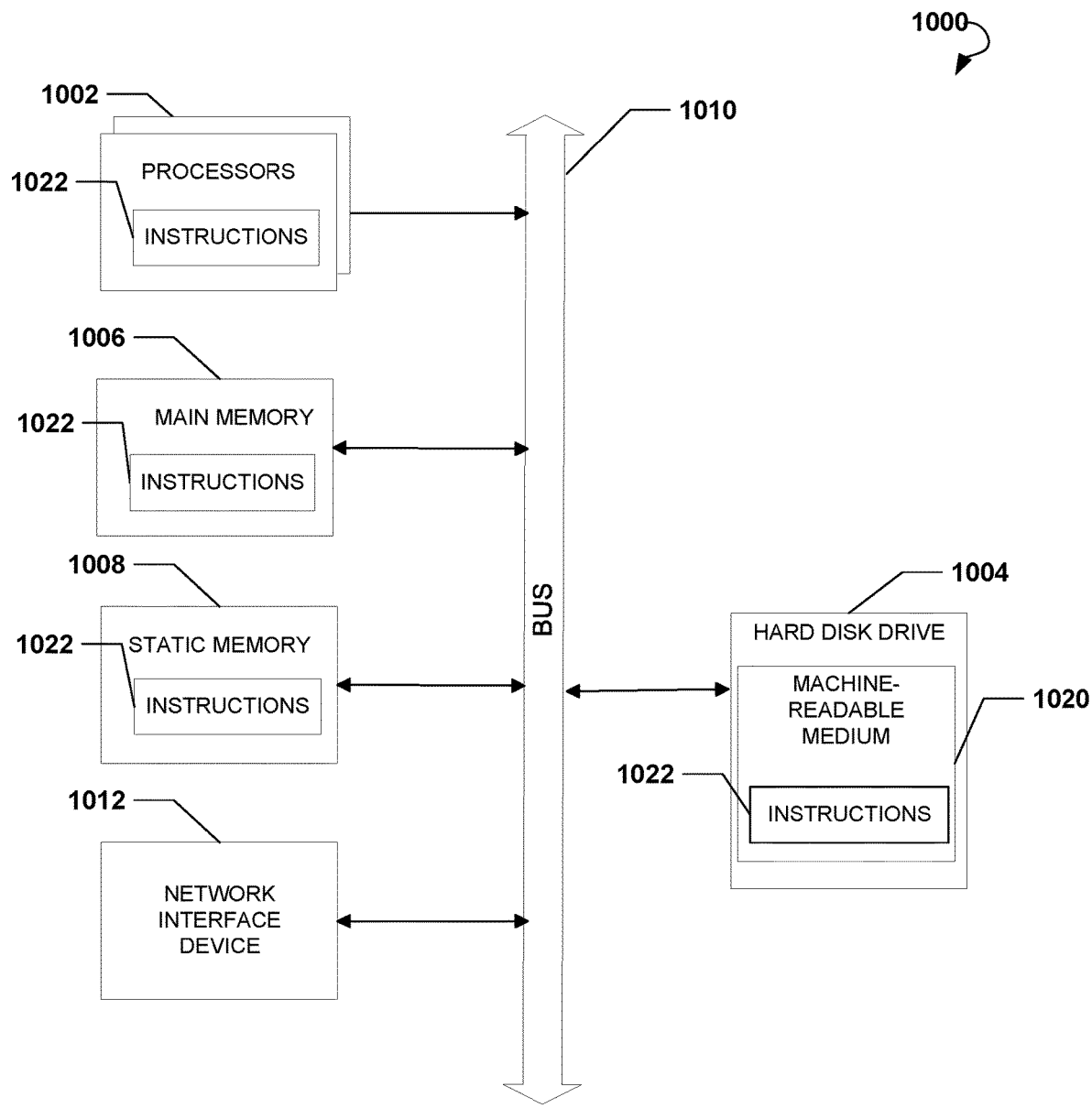
FIG. 10 shows a computing system that can be used to implement a method for transferring data via a two-way radio transmission, according to an example embodiment.

FIG. 10 shows a diagrammatic representation of a computing device for a machine in the exemplary electronic form of a computer system 1000, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer, a tablet personal computer, a set-top box, a cellular telephone, a digital camera, a portable music player (e.g., a portable hard drive audio device, such as a Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1000 may include a processor or multiple processors 1002, a hard disk drive 1004, a main memory 1006, and a static memory 1008, which communicate with each other via a bus 1010. The computer system 1000 may also include a network interface device 1012. The hard disk drive 1004 may include a computer-readable medium 1020, which stores one or more sets of instructions 1022 embodying or utilized by any one or more of the methodologies or functions described herein. The instructions 1022 can also reside, completely or at least partially, within the main memory 1006, the static memory 1008, and/or within the processors 1002 during execution thereof by the computer system 1000. The main memory 1006 and the processors 1002 also constitute machine-readable media.

While the computer-readable medium 1020 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, Random Access Memory, Read-Only Memory, and the like.

The example embodiments described herein may be implemented in an operating environment comprising software installed on a computer, in hardware, or in a combination of software and hardware.

In some embodiments, the computer system 1000 may be implemented as a cloud-based computing environment, such as a virtual machine operating within a computing cloud. In other embodiments, the computer system 1000 may itself include a cloud-based computing environment, where the functionalities of the computer system 1000 are executed in a distributed fashion. Thus, the computer system 1000, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 1000, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Figure 11:
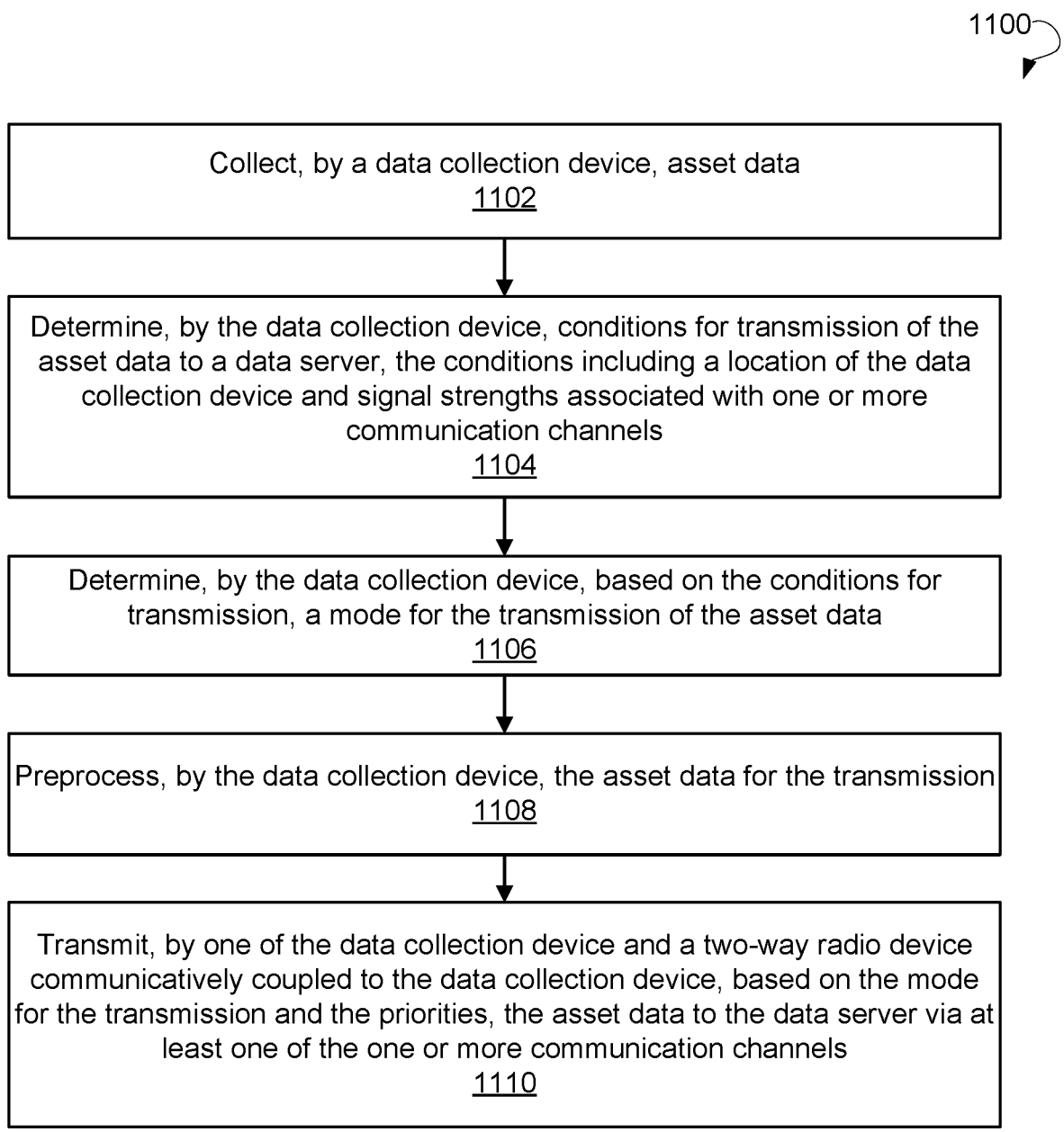
FIG. 11 is a flow chart illustrating a method for transferring data via a two-way radio transmission, in accordance with an example embodiment.

FIG. 11 is a process flow diagram showing a method 1100 for transferring data via a two-way radio transmission, according to an example embodiment. In some embodiments, the operations may be combined, performed in parallel, or performed in a different order. The method 1100 may also include additional or fewer operations than those illustrated. The method 1100 may be performed by processing logic that may comprise hardware (e.g., decision making logic, dedicated logic, programmable logic, and microcode), software (such as software run on a general-purpose computer system or a dedicated machine), or a combination of both.

The method 1100 may commence with collecting, by a data collection device, asset data at operation 1102. In an example embodiment, the asset data may be associated with at least one of the following: a vehicle, a stationary asset, a mobile asset, a building, a person, and so forth. In an example embodiment, the asset data may be provided by at least one sensor communicatively coupled to the data collection device by at least one of a wired connection or a wireless communication connection. The wireless communication connection may include one or more of the following: WiFi®, Bluetooth®, NFC, ZigBee®, Microwave, Infrared, and RFID, $4^{th}$ generation (4G) network, $5^{th}$ generation (5G) network, and so forth. The wired connection may include one of the following: a USB connection, a serial connection, a fiber-optic connection, an Ethernet connection, and so forth.

The at least one sensor may include at least one of the following: a portable sensor, a sensor fixed to the data collection device, a sensor integrated into the data collection device, a sensor integrated into the two-way radio device, and so forth. In an example embodiment, the at least one sensor may provide one or more of the following parameters: a GPS location, a time, a speed, a velocity, an acceleration, a deceleration, a direction, an orientation, an impact detection, an impact detection due to a gunshot, a gunshot detection, a sound, a vibration, a pulse, a status of an object, biometric data, a radiological snapshot, a heart-rate, a button status, a switch status, a temperature, a pressure, a light intensity, an audio, an image, a file, a magnetic proximity, a radiological parameter, a chemical parameter, a chemical change, a biological parameter, a nuclear parameter, a door status, a window status, an electronic control module status, a computer status, a server status, a circuit status, a microprocessor status, a valve status, an aperture status, a vent status, a gap status, a conduit status, a proximity status, a people counter, a door barricade status, a fuel level, a fluid level, a pneumatic status, a hydrostatic status, a hydraulic status, a pressure status, a compression status, a tension status, a color, a color array, a light, a light intensity, a light array, an intensification, a magnification, an ammunition round count, an ammunition chamber status, a munition count, a munition status, a surveillance tower status, an unmanned vehicle status, a repeater status, a receiver status, a crash detection, a driver behavior, a CAN data parameter, a Local Interconnect Network data parameter, an Ethernet data parameter, a serial data parameter, an engine diagnostic and prognostic data parameter, a driver status report, an odometer reading, a driver user input display status, an electronic driver log, and so forth.

The method 1100 may continue with determining, by the data collection device, conditions for transmission of the asset data to a data server at operation 1104. The conditions may include a location of the data collection device and signal strengths associated with one or more communication channels. In an example embodiment, the determination of the signal strengths may include matching the location of the data collection device to a pre-generated map of signal strengths.

The method 1100 may further include determining, by the data collection device, a mode for the transmission of the asset data at operation 1106. The mode may be determined based on the conditions for transmission. In an example embodiment, the mode for the transmission may be based on one or more of the following: a data channel bandwidth, a feedback from the data server, historical data, a data sensitivity, a scrambling requirement, a data prioritization requirement, data classification, a metric, a signal strength, and so forth. In some example embodiments, the mode for the transmission may alternate between a traditional two-way radio network and a cellular data network.

The method 1100 may continue with preprocessing, by the data collection device, the asset data for the transmission at operation 1108. The preprocessing may include determining that the conditions for transmission of the asset data satisfy predetermined criteria. The preprocessing may further include setting priorities for one or more parts of the asset data. The priorities may be set in response to the determination that that the conditions for transmission of the asset data satisfy predetermined criteria. The priorities may be set based at least on a type of the data and the location of the data collection device. In an example embodiment, the preprocessing may include one or more of the following: compressing, packaging, timing, rearranging, classifying, prioritizing, encrypting, and so forth.

The method 1100 may further include transmitting the asset data to the data server via at least one of the one or more communication channels at operation 1110. The transmission may be performed by one of the data collection device and a two-way radio device communicatively coupled to the data collection device. The transmission may be performed based on the mode for the transmission and the priorities. In an example embodiment, the asset data may be transferred to the data server via a base station receiver. The at least one of the one or more communication channels may include one or more of the following: a two-way radio protocol, a cellular communication channel, a satellite communication channel, and so forth.

In an example embodiment, either the data collection device or the two-way radio device may be remotely programmable to operate in a plurality of communication channels and transmit the asset data via a plurality of intermediate devices. An intermediate device of the plurality of intermediate devices may include any of a repeater, a radio trunking system, a picocell, a receiver, and so forth. The intermediate device may be part of one or more of the following networks: a cellular data network, a satellite data network, a radio network, a digital RF network, a digital radio network, a VHF network, a UHF network, a HF network, and so forth.

In an example embodiment, the method 1100 may further include receiving two or more data signals by the data collection device. Upon receiving the two or more data signals, the data collection device may determine timings associated with the two or more data signals. The data collection device may compare a timing associated with a first data signal of the two or more data signals and a timing associated with a second data signal of the two or more data signals. Based on the comparison, the data collection device may determine that the timing of the first data signal is smaller than the timing of the second data signal. The data collection device may determine that the first data signal is an original signal and the second data signal is a reflected signal of the original signal. In an example embodiment, the determination that the first data signal is the original signal and the second data signal is the reflected signal of the original signal may be made based on the determination that the timing of the first data signal is smaller than the timing of the second data signal.

In an example embodiment, the method 1100 may further include receiving two or more data signals by the data collection device. Upon receiving the two or more data signals, the data collection device may determine a signal strength of a first data signal of the two or more data signals and a signal strength of a second data signal of the two or more data signals. The data collection device may compare the signal strength of the first data signal and the signal strength of the second data signal. Based on the comparison, the data collection device may determine that the signal strength of the first data signal is higher than the signal strength of the second data signal. The data collection device may determine that the first data signal is an original signal and the second data signal is a reflected signal of the original signal. In an example embodiment, the determination that the first data signal is the original signal and the second data signal is the reflected signal of the original signal is made based on determination that the signal strength of the first data signal is higher than the signal strength of the second data signal.

Thus, systems and methods for transferring data via a two-way radio transmission are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for transferring data via a two-way radio transmission, the system comprising:
 a data collection device configured to:
  collect asset data;
  determine conditions for transmission of the asset data to a data server, the conditions including a location of the data collection device or signal strengths associated with one or more communication channels;
  determine, based on the conditions for transmission, a mode for the transmission of the asset data; and
  preprocess the asset data for the transmission, wherein the preprocessing includes:

determining whether the conditions for transmission of the asset data satisfy predetermined criteria for data prioritizing; and in response to the determination that the conditions for transmission satisfy the predetermined criteria for data prioritizing, setting, based at least on a type of the data and the location of the data collection device, priorities for one or more parts of the asset data; and a two-way radio device communicatively coupled to the data collection device, the two-way radio device and the data collection device being configured to:

when the conditions for transmission fail to satisfy the predetermined criteria for data prioritizing, transmit, based on the mode for the transmission, the asset data to the data server via the at least one of the one or more communication channels; and when the conditions for transmission satisfy the predetermined criteria for data prioritizing, transmit, based on the mode for the transmission and the priorities, the asset data to the data server via at least one of the one or more communication channels.

2. The system of claim 1, wherein the data collection device is further configured to:
receive two or more data signals;
determine timings associated with the two or more data signals;
compare a timing associated with a first data signal of the two or more data signals and a timing associated with a second data signal of the two or more data signals;
based on the comparison, determine that the timing of the first data signal is smaller than the timing of the second data signal; or
determine that the first data signal is an original signal and the second data signal is a reflected signal of the original signal.

3. The system of claim 1, wherein the data collection device is further configured to:
receive two or more data signals;
determine a signal strength of a first data signal of the two or more data signals and a signal strength of a second data signal of the two or more data signals;
compare the signal strength of the first data signal and the signal strength of the second data signal;
based on the comparison, determine that the signal strength of the first data signal is higher than the signal strength of the second data signal; or
determine that the first data signal is an original signal and the second data signal is a reflected signal of the original signal.

4. The system of claim 1, wherein the determination of the signal strengths includes matching the location of the data collection device to a pre-generated map of signal strengths.

5. The system of claim 1, further comprising a base station receiver, wherein the asset data are transferred to the data server via the base station receiver.

6. The system of claim 1, wherein either the data collection device or the two-way radio device is remotely programmable to:
operate in a plurality of communication channels; and
transmit the asset data via a plurality of intermediate devices.

7. The system of claim 6, wherein an intermediate device of the plurality of intermediate devices is either a repeater, a radio trunking system, a picocell, or a receiver.

8. The system of claim 7, wherein the intermediate device is part of one or more of following networks: a cellular data network, a satellite data network, a radio network, a digital Radio Frequency (RF) network, a digital radio network, a Very High Frequency (VHF) network, an Ultra High Frequency (UHF) network, and a High Frequency (HF) network.

9. The system of claim 1, wherein the asset data are provided by at least one sensor communicatively coupled to the data collection device by at least one of a wired connection or a wireless communication connection.

10. The system of claim 9, wherein the at least one sensor provides one or more of following parameters: a Global Positioning System location, a time, a speed, a velocity, an acceleration, a deceleration, a direction, an orientation, an impact detection, an impact detection due to a gunshot, a gunshot detection, a sound, a vibration, a pulse, a status of an object, biometric data, a radiological snapshot, a heart-rate, a button status, a switch status, a temperature, a pressure, a light intensity, an audio, an image, a file, a magnetic proximity, a radiological parameter, a chemical parameter, a chemical change, a biological parameter, a nuclear parameter, a door status, a window status, an electronic control module status, a computer status, a server status, a circuit status, a microprocessor status, a valve status, an aperture status, a vent status, a gap status, a conduit status, a proximity status, a people counter, a door barricade status, a fuel level, a fluid level, a pneumatic status, a hydrostatic status, a hydraulic status, a pressure status, a compression status, a tension status, a color, a color array, a light, a light intensity, a light array, an intensification, a magnification, an ammunition round count, an ammunition chamber status, a munition count, a munition status, a surveillance tower status, an unmanned vehicle status, a repeater status, a receiver status, a crash detection, a driver behavior, a Controller Area Network data parameter, a Local Interconnect Network data parameter, an Ethernet data parameter, a serial data parameter, an engine diagnostic and prognostic data parameter, a driver status report, an odometer reading, a driver user input display status, and an electronic driver log.

11. The system of claim 9, wherein the at least one sensor includes at least one of following: a portable sensor, a sensor fixed to the data collection device, a sensor integrated into the data collection device, and a sensor integrated into the two-way radio device.

12. The system of claim 9, wherein:
the wireless communication connection includes one or more of following: WiFi, Bluetooth, Near Field Communication, ZigBee, Microwave, Infrared, and Radio Frequency Identification, 4G, and 5G; and
the wired connection includes one of following: a Universal Serial Bus connection, a serial connection, a fiber-optic connection, and an Ethernet connection.

13. The system of claim 1, wherein the at least one of the one or more communication channels includes one or more of following: a two-way radio protocol, a cellular communication channel, and a satellite communication channel.

14. The system of claim 1, wherein:
the two-way radio device is integrated into the data collection device; or
the data collection device is integrated into the two-way radio device; and
wherein the two-way radio device and the data collection device are resident in a same piece of hardware.

15. The system of claim 1, wherein the asset data are associated with at least one of following: a vehicle, a stationary asset, a mobile asset, a building, and a person.

16. The system of claim 1, wherein the mode for the transmission is based on one or more of following: a data channel bandwidth, a feedback from the data server, historical data, a data sensitivity, a scrambling requirement, a data prioritization requirement, data classification, a metric, and a signal strength.

17. The system of claim 1, wherein the mode for the transmission alternates between a two-way radio network and a cellular data network.

18. A method for transferring data via a two-way radio transmission, the method comprising:
   collecting, by a data collection device, asset data;
   determining, by the data collection device, conditions for transmission of the asset data to a data server, the conditions including a location of the data collection device and signal strengths associated with one or more communication channels;
   determining, by the data collection device, based on the conditions for transmission, a mode for the transmission of the asset data;
   preprocessing, by the data collection device, the asset data for the transmission, wherein the preprocessing includes:
      determining whether the conditions for transmission of the asset data satisfy predetermined criteria for data prioritizing; and
      in response to the determination that the conditions for transmission satisfy the predetermined criteria for data prioritizing, setting, based at least on a type of the data and the location of the data collection device, priorities for one or more parts of the asset data; and
   when the conditions for transmission fail to satisfy the predetermined criteria for data prioritizing, transmitting, by one of the data collection device and a two-way radio device communicatively coupled to the data collection device, based on the mode for the transmission, the asset data to the data server via the at least one of the one or more communication channels; and
   when the conditions for transmission satisfy the predetermined criteria for data prioritizing, transmitting, by one of the data collection device and the two-way radio device communicatively coupled to the data collection device, based on the mode for the transmission and the priorities, the asset data to the data server via at least one of the one or more communication channels.

19. The method of claim 18, wherein the preprocessing includes one or more of following: compressing, packaging, timing, rearranging, classifying, prioritizing, and encrypting.

20. A system for transferring data via a two-way radio transmission, the system comprising:
   a data collection device configured to:
      collect asset data, wherein the asset data are provided by at least one sensor communicatively coupled to the data collection device by at least one of a wired connection or a short-range wireless connection;
      determine conditions for transmission of the asset data to a data server, the conditions including a location of the data collection device and signal strengths associated with one or more communication channels;
      determine, based on the conditions for transmission, a mode for the transmission of the asset data; and
      preprocess the asset data for the transmission, wherein the preprocessing includes:
         determining whether the conditions for transmission of the asset data satisfy predetermined criteria for data prioritizing; and
         in response to the determining that the conditions for transmission satisfy the predetermined criteria for data prioritizing, setting, based at least on a type of the data and the location of the data collection device, priorities to one or more parts of the asset data; and
   a two-way radio device communicatively coupled to the data collection device, the two-way radio device and the data collection device being configured to:
      when the conditions for transmission fail to satisfy the predetermined criteria for data prioritizing, transmit, based on the mode for the transmission, the asset data to the data server via the at least one of the one or more communication channels; and
      when the conditions for transmission satisfy the predetermined criteria for data prioritizing, transmit, based on the mode for the transmission and the priorities, the asset data to the data server via at least one of the one or more communication channels;
      wherein the mode for the transmission alternates seamlessly between a two-way radio network and a cellular data network; and
   a user interface portal communicatively coupled to the data server, the user interface portal being configured to provide a user with access to the asset data stored on the data server.

* * * * *